Nov. 10, 1964  R. D. BUELL, JR  3,156,212
FLUID OPERATED SONIC TRANSDUCER
Filed April 20, 1962
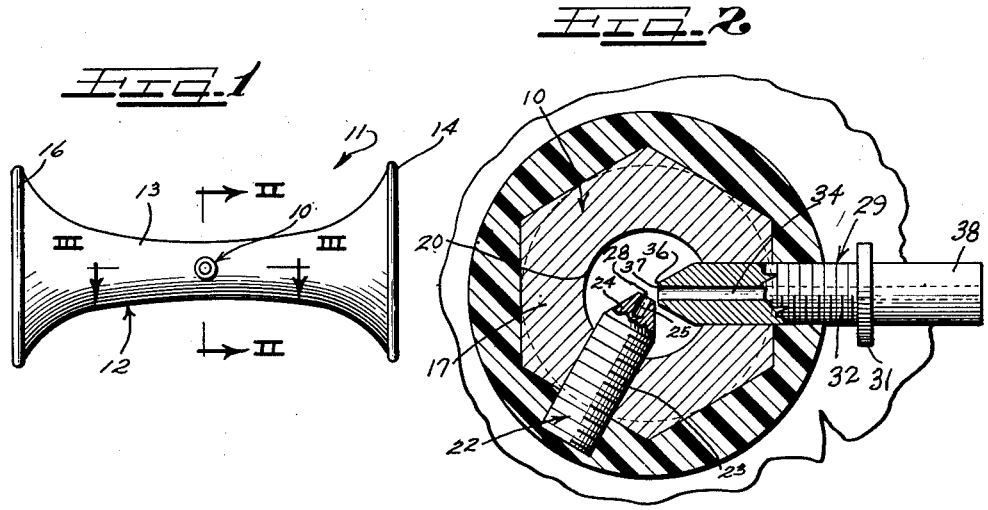
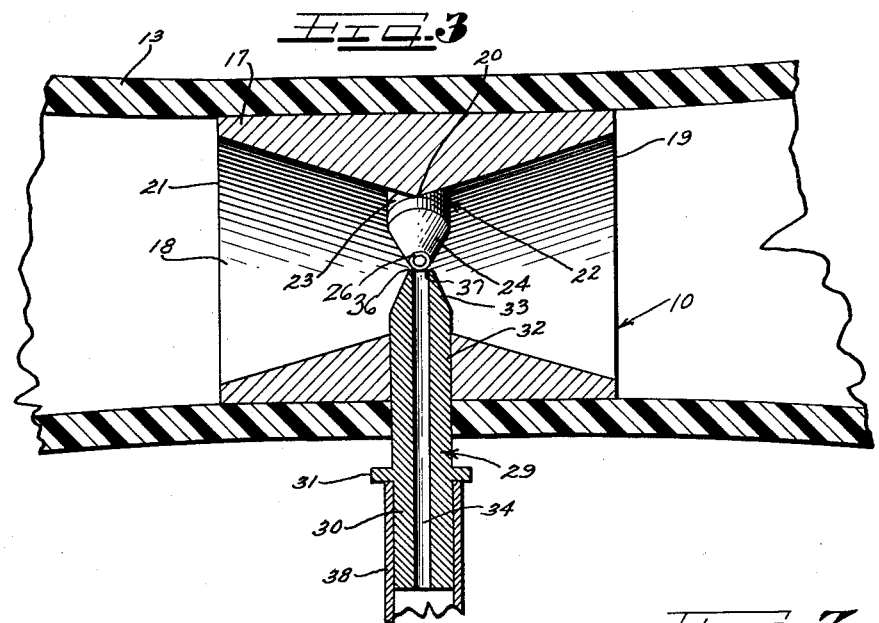
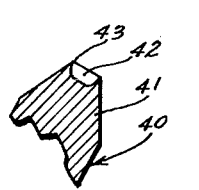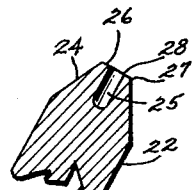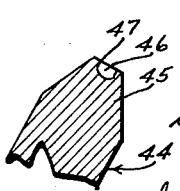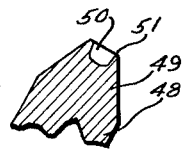
INVENTOR.
ROY D. BUELL JR.
BY
ATTORNEYS

United States Patent Office 3,156,212
Patented Nov. 10, 1964

3,156,212
FLUID OPERATED SONIC TRANSDUCER
Roy D. Buell, Jr., Hinsdale, Ill., assignor to Buell Manufacturing Company, Lyons, Ill., a corporation of Illinois
Filed Apr. 20, 1962, Ser. No. 189,121
2 Claims. (Cl. 116—137)

This invention generally relates to a "silent" horn and more particularly to an ultrasonic generating transducer.

There is a direct relation between the size of the brain cavity or cranium of a living creature and the sound wave frequencies that are tolerable by said creature. The sound wave frequency tolerance increases with the size of the brain cavity or cranium. As a result, small rodents, birds, and similar creatures that have a rather small cranium cannot tolerate ultrasonic sound waves which are tolerable to humans.

An ultrasonic frequency of from approximately 18 kilocycles to approximately 32 kilocycles is above the normal human audible level and does not affect a human. Yet, this ultrasonic frequency is so irritating to rats and mice that they will stay away from or leave any area that is subjected to these ultrasonic sound waves. In fact, rats and mice which were trapped within this ultrasonic sound barrier have been known to destroy themselves in order to escape the irritation caused by the ultrasonic sound waves. The instant invention is directed to an ultrasonic transducer that is capable of generating ultrasonic waves within the above frequency range. The ultrasonic transducer of the present invention plays an important role in granary rodent control and the like. It is of course understood that effective pigeon and starling control is also provided for by the present invention.

The instant invention provides an ultrasonic generating transducer which is fluid operated. A fluid ultrasonic transducer breaks through the economical barrier presented by known electronic ultrasonic generating transducers. Electronic transducers are expensive because of the high cost of components that are needed to make them, and further, electronic transducer components are relatively sensitive and have an inherent relatively short life span. Therefore, they require relatively frequent repairs and replacement.

The fluid operated ultrasonic generating transducer of the present invention does not have any moving components and the components used are long lasting and will not wear out as do the components in electronic ultrasonic transducers. The transducer of the present invention is enduring, long lasting, and inexpensive.

It is therefore an object of the present invention to provide a fluid operated transducer capable of generating ultrasonic waves.

It is another object of the present invention to provide rodent control by using ultrasonic sound frequencies.

It is still another object of the present invention to provide a method for controlling the habitation of living creatures having relatively small craniums or brain cavities.

It is still another object of the present invention to provide a method for producing ultrasonic frequencies with a fluid.

It is still a further object of the present invention to provide an ultrasonic generating transducer device that is gas operated.

Other objects, features, and advantages of the present invention will be apparent from the following detailed description taken in conjunction with the accompanying figures of the drawings.

On the drawings:

FIGURE 1 is a side elevational view of a double bell equipped sonic transducer in accordance with the present invention;

FIGURE 2 is an enlarged transverse cross-sectional view of the transducer of the present invention taken along lines II—II of FIGURE 1;

FIGURE 3 is an enlarged longitudinal cross-sectional view of the transducer of the present invention taken along lines III—III of FIGURE 1;

FIGURE 4 is a partial longitudinal cross-sectional view of a resonator used in the present invention;

FIGURE 5 is a further partial longitudinal cross-sectional view of the resonator shown in FIGURE 2 in the present invention;

FIGURE 6 is a partial longitudinal cross-sectional view of another resonator that may be used in the present invention; and FIGURE 7 is a partial longitudinal cross-sectional view of another resonator that may be used in the present invention.

As shown on the drawings:

Referring to FIGURES 1 and 2 the ultrasonic transducer 10 of this invention is part of an assembly 11 including a tubular double bell mouthed housing 12. The double bell housing 12 has a narrow central throat portion 13 and two enlarged mouths 14 and 16 at the ends thereof. The mouths 14 and 16 face in opposite directions to each other. The bell housing 12 can be composed of plastic, metal or the like structural material and is used to amplify and direct the ultrasonic waves produced therein by the transducer 10.

Although only a double bell housing is shown, it is of course understood that the ultrasonic generating transducer 10 of the present invention may be inserted into any type of housing to give the ultrasonic waves amplification and direction, i.e., a single bell housing. The amplifying and directing means may even be completely eliminated without effecting the generation of ultrasonic waves.

Referring to FIGURES 2 and 3 the ultrasonic transducer 10 of the present invention is shown to include a hexagonal housing 17 composed of metal such as brass. The housing 17 is permanently affixed to the inner circumference of the double bell throat 13. It is of course understood, that the housing may have any external configuration desired and a hexagonal shape is shown for ease in fixedly moulding in a plastic throat.

The hexagonal housing defines a converging-diverging passageway or venturi 18. The passageway converges inwardly from a housing end 19 and diverges from approximately a center 20 to an end 21. The passageway 18 therefore presents a configuration whereby the cut-off apex of two frusto-conical passages are joined.

The passageway is concentric with the throat 13 and the passage end 19 faces the housing mouth 14 and the passage end 21 faces the housing mouth 16.

Threaded into one side of the housing 17, approximately at the center 20 and normal to axial center line, is a resonator plug 22. The resonator 22 has a threaded stem portion 23 and a frusto-conical end portion 24. The frusto-conical resonator end portion has its base integral with the stem portion 23 and extends into the passage 18. The resonator end defines a cylindrical resonator cavity 25. The cavity opens at the cut-off apex 26 of the resonator 22. The resonator end is finished to present a sharp outer edge 27 and a sharp resonator cavity edge 28, as is illustrated in FIGURE 5.

An apertured fluid inlet or injector tube or nozzle 29 is threaded into another side of the housing 17 approximately at the center line 20 and normal to the axial center line. The fluid injector 29 has an inlet stem portion 30, a flange 31, a threaded outlet stem portion 32, a frusto-conical outlet end portion 33, and defines a fluid passage 34 therethrough. The frusto-conical end portion 33 has its base integral with the outlet stem portion 23 and extends into the passage 18. The cut-off apex of end portion 33 is finished to present a sharp outer edge 36 and sharp fluid passage edge 37.

The inlet stem portion 30 and the flange 31 accommodate a fluid supply conduit 38. The supply conduit 38 is a rubber hose or similar type conduit that is attached to the inlet stem 30 with the flange 31 acting as a stop. The supply conduit is used to connect the nozzle 29 with a source of pressurized fluid (not shown).

The frusto-conical resonator end portion 24 and the frusto-conical nozzle end portion 33 are finished and so shaped that they may be positioned in close proximity to each other. It is of course understood that the resonator end portion 24 and nozzle end portion 33 may have any shape desired. However, a sharp cavity edge finishing is essential to the effective operation of the resonator 22.

The nozzle 29 and resonator 22 are threaded into the housing 17 so that the axial center line of the fluid passage 34 and the axial center line of the resonator cavity 25 intersect each other at an angle of approximately 120° and define a plane perpendicular to the axial center line of the converging-diverging passage 18. However, the plane perpendicular to the axial center line only to allow ultrasonic waves to be directed from both sides of the housing equally. If this is not desired, the plane may be at an angle to the axial center line.

The resonator 22 and the nozzle 29 are threadedly adjustable in the transducer housing 17. They are spaced apart as desired. When the desired distance between the nozzle and resonator is determined, the nozzle and resonator are adjusted to this position and preferably affixed to the bell throat 13, as is illustrated in FIGURE 2. The nozzle has a portion of its threaded stem, its flange and its inlet stem portion extending outwards through the bell throat 13 so that it may be connected to the fluid supply. The resonator does not extend through the bell throat 13. However, it is essential that the nozzle and resonator be spaced so that the entire resonator cavity mouth 39 formed by the sharp edge rim 28 is covered with fluid exiting from the nozzle 29.

The closer the nozzle and resonator are together the more efficient the transducer is. When the nozzle passage and the resonator cavity are close together, an air pressure of 1 to 3 pounds per square inch will generate ultrasonic frequencies of 18 to 30 kilocycles.

The fluid pressure has to be increased when the distance between the resonator cavity and fluid nozzle is increased and pressures of 1 to 15 p.s.i. have generated ultrasonic waves. An increased distance however tends to lower the efficiency of the fluid operator transducer.

In operation, a stream of fluid such as air or any other gas or vapor or even a liquid is ejected from the mouth of the nozzle 29 to impinge upon the apex 26 of the resonator 22 and envelope the mouth of the cavity 25. The sharp edge 28 of the cavity mouth cuts this stream with part of the stream being deflected into the cavity 25 while the remainder of the stream flows over the outer edge 27 of the resonator apex. The volume of the cavity 25 is related to the flow rate of the fluid stream to produce the desired pitch. The flow rate is determined by fluid pressure and size of the passage 34. The fluid passing over the resonator apex is dissipated through the venturi like throat in both directions.

For conservation of fluid the nozzle and resonator should be close together and conical end shapes thereon accommodate close spacing. The flow rate of fluid should be constant if steady uniform sound emission is desired but varying siren like sound cycles can be produced by varying the fluid pressure, and hence the flow rate, between alternate highs and lows.

The venturi throat or passages 18 and 19 amplify the ultrasonic waves emerging from the resonator and the bell mouth housing 13 directs these waves. The housing is thus used to render the transducer more directional and distance penetrating in the manner of a horn. The housing 13 can be omitted entirely where depth penetration is not needed and the waves emerging from the passage 18 will then fan out over a greater radius area which will be relatively shallow since the size of the resonator cavity 25 as well as the air pressure determines the frequency of the sound waves, the resonator cavities are sized for specific frequencies. The frequency is dependent upon the volume of the resonator cavity and air pressure. This is illustrated by FIGURES 4 and 5. There is shown a resonator 40 with a frusto-conical end portion 41 defining a resonator cavity 42 with a sharp cavity rim edge 43 and resonator 22 having a resonator cavity 25. The resonator cavities 42 and 25 have the same volume and will generate the same frequency with the same air pressure. This is so even though the cavity 42 is shallower than the cavity 25. Higher pressures generally increase the sound wave frequency, however, higher pressures will only increase the frequency to a point and further increases in pressure stop the generation of sound waves.

When the volume of the resonator cavity is decreased, and the air pressure is held constant, the frequency increases. This is illustrated by FIGURE 6. There is shown a resonator 44 with a frusto-conical end portion 45 defining a resonator cavity 46 with a sharp cavity rim edge 47 and has a lesser volume than resonator cavity 25 and generates a higher frequency with the same air pressure.

When the volume of the resonator cavity is increased, and the air pressure is held constant, the frequency decreases. This is illustrated by FIGURE 7. A resonator 48, with a frusto-conical head 49 defining a resonator cavity 50 having a sharp cavity rim edge 51 and having a greater volume than resonator cavity 25, generates a lower frequency than resonator cavity 25. Therefore, the sound wave frequency generated by constant air pressure varies inversely to the volume of the resonator cavity.

The transducer of the present invention operates with such a small gas input that it can be economically continuously used for pest control in granaries, in trees, on buildings and in any area where rodents, birds and the like small crania creatures congregate. The ultrasonic waves are amplified and directed by suitable bell housing or horns to concentrate the sound waves within selected areas and humans are not disturbed by the ultrasonic waves. However, the small brain cavity pests are driven away by ultrasonic waves that are unbearable to them.

From the above description, it will therefore be understood that this invention now provides an inexpensive efficient ultrasonic generating transducer. Although various minor modifications might be apparent to those skilled in the art, it is to be understood that I wish to embody within the scope of the patent warranted hereon all such embodiments as reasonably and properly come within the scope of my contribution to the art.

I claim as my invention:
1. An ultrasonic transducer comprising:
an amplifying and directing housing,
a transducer affixed within said amplifying housing,
said transducer having
a transducer housing defining a converging diverging passageway,
an ultrasonic resonator passing through said transducer housing and affixed to said amplifying housing,
a resonator cavity to generate ultrasonic waves defined by said resonator,
said resonator cavity having a mouth with a sharp cavity outer rim edge and being within said converging-diverging passageway,
a nozzle having an outlet for directing fluid towards said resonator cavity,
said nozzle outlet being spaced from said resonator so as to direct fluid before the cavity edge and across the entire mouth of the cavity, said nozzle and said resonator being spaced so that the longitudinal center line of said resonator mouth intersects the longitudinal center line of said nozzle outlet at an angle in the order of 120°, and means to supply pressurized air to said nozzle whereby ultrasonic waves are generated by impinging fluid onto the resonator.

2. A fluid operated ultrasonic transducer for controlling the habitation of rodents comprising:

an amplifying and directing housing,
a transducer affixed within said amplifying housing,
said transducer having
- a transducer housing defining a passageway,
- a resonator passing through said transducer housing and affixed to said amplifying housing,
- a resonator cavity to generate ultrasonic waves defined by said resonator,
- said resonator cavity having a mouth with a sharp cavity outer rim edge and being within said passageway,
- a nozzle having an outlet for directing air towards said resonator cavity,
- said nozzle outlet being closely spaced from said resonator to direct air before the cavity edge and across the entire mouth of the cavity, said nozzle and said resonator being spaced so that the longitudinal center line of said resonator mouth intersects the longitudinal center line of said nozzle outlet at an angle in the order of 120°, and means to supply pressurized air to said nozzle whereby rodent irritating ultrasonic waves of 18 to 30 kilocycles are generated by impinging air onto the resonator.

References Cited in the file of this patent

UNITED STATES PATENTS

| | | |
|---|---|---|
| 189,587 | Thompson | Apr. 17, 1877 |
| 953,044 | Macloskie | Mar. 29, 1910 |
| 1,252,232 | Buell | Jan. 1, 1918 |
| 1,259,875 | Kohn | Mar. 19, 1918 |
| 1,626,198 | Jacquemin | Apr. 26, 1927 |
| 2,238,668 | Wellenstein | Apr. 15, 1941 |
| 2,519,619 | Yellott et al. | Aug. 22, 1950 |
| 2,790,164 | Oberg | Apr. 23, 1957 |

FOREIGN PATENTS

| | | |
|---|---|---|
| 851,194 | Great Britain | Oct. 12, 1960 |